(12) United States Patent
Sasaki et al.

(10) Patent No.: US 6,828,407 B2
(45) Date of Patent: Dec. 7, 2004

(54) POLYMER ELECTROLYTE COMPOSITION AND USES THEREOF

(75) Inventors: Shigeru Sasaki, Tsukuba (JP); Arihiro Yashiro, Ibaraki (JP); Yasuaki Hidaka, Tokyo (JP); Takumi Taniguchi, Togo (JP)

(73) Assignees: Sumitomo Chemical Company, Limited, Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/341,500

(22) Filed: Jan. 14, 2003

(65) Prior Publication Data

US 2003/0166824 A1 Sep. 4, 2003

(30) Foreign Application Priority Data

Jan. 15, 2002 (JP) ........................................ 2002-005796
Jan. 15, 2002 (JP) ........................................ 2002-005797

(51) Int. Cl.$^7$ ........................... C08G 59/00; C08G 65/00
(52) U.S. Cl. ............................ 528/86; 528/89; 528/148; 528/373
(58) Field of Search ........................... 528/86, 89, 148, 528/373

(56) References Cited

U.S. PATENT DOCUMENTS

| | | | |
|---|---|---|---|
| 3,748,306 | A | 7/1973 | Khattab |
| 4,008,191 | A | 2/1977 | Jagur-Grodzinski et al. |
| 4,996,271 | A | 2/1991 | Guiver et al. |
| 5,525,436 | A | 6/1996 | Savinell et al. |
| 2003/0113605 | A1 | 6/2003 | Hidaka et al. |

FOREIGN PATENT DOCUMENTS

| | | |
|---|---|---|
| EP | 0 932 213 A1 | 7/1999 |
| JP | 9-87510 A | 3/1997 |
| JP | 9-110982 A | 4/1997 |
| JP | 11-503262 A | 3/1999 |
| JP | 2000-11755 A | 1/2000 |
| JP | 2000-11756 A | 1/2000 |
| JP | 2001-118591 A | 4/2001 |
| JP | 2002-146016 A | 5/2002 |
| JP | 2002-241493 A | 8/2002 |
| JP | 2002-319414 A | 10/2002 |
| WO | WO 00/66254 A1 | 11/2000 |

OTHER PUBLICATIONS

Suzuki et al; Solid polymer electrolyte having high durability; Jun. 2001; Chem Abstract 135: 62388.*
Sada et al; Manufacture of aromatic polymeric cation exchangers; Jan. 1989; Chem Abstract 111: 98651 ▢▢▢▢.*

Meng et al., "Synthesis and Proton Conductivities of Phosphonic Acid Containing Poly–(arylene ether)s", *Journal of Polymer Science*, Polymer Chemistry Edition, vol. 39, No. 19, Oct. 1, 2001, XP–001096870, pp. 3218–3226.

Cabasso et al., "Synthesis and Characterization of Polymers with Pendent Phosphonate Groups", *Journal of Applied Polymer Science*, vol. 18, No. 7, 1974, XP 000575506, pp. 1969–1986.

Djerassi, "Brominations with N–Bromosuccinimide and Related Compounds The Wohl–Ziegler Reaction", Chemical Reviews, American Chemical Society, 1984, pp. 271–317.

Carreno et al., "N–Bromosuccinimide in Acetonitrile: A Brominating Reagant for Methoxybenzenes and Naphthalenes", Journal of Organic Chemistry, American Chemistry Society, vol. 60, No. 16, Aug. 11, 1995, pp. 1137–1142.

P. Tavs, Reaktion von Arylhalogeniden mit Trialkylphosphiten und Benzol–phosphonigsäure–dialkylestern zu aromatischen Phosphonsäure–estern und Phosphinsäureestern unter Nickelsalzkatalyse, Chem. Ber., 103, 1970 pp. 2428–2436, Abstract.

Copy of Search Report dated Apr. 1, 2004.

* cited by examiner

Primary Examiner—Duc Truong
(74) Attorney, Agent, or Firm—Sughrue Mion, PLLC

(57) ABSTRACT

The present invention provides a polymer electrolyte composition excellent in radical resistance and/or proton conductivity. The polymer electrolyte composition comprises an aromatic polymer phosphonic acid derivative represented by the following formula (1); and at least one selected from the group consisting of a phosphoric acid derivative and a polymer electrolyte.

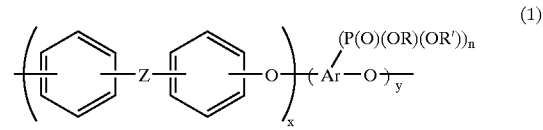

(1)

(wherein -Z- represents —$SO_2$— or —CO—, x and y each represent 0.01-0.99 provided that the sum of x and y is 1, —Ar— represents a divalent aromatic group of 4–18 carbon atoms which may contain a hetero atom and may contain one or more substituents, n represents the average number of substituents per unit structure of polymeric moiety containing the aromatic group and is a positive number of 8 or less, and R and R' each independently represent a hydrogen atom or an alkyl group).

16 Claims, No Drawings

POLYMER ELECTROLYTE COMPOSITION AND USES THEREOF

BACKGROUND OF THE INVENTION

1. Field of the Invention

The present invention relates to a polymer electrolyte composition, and, particularly, to a polymer electrolyte composition suitably usable for fuel cells.

2. Description of Related Art

Recently, fuel cells are noticed as clean energy conversion apparatuses of high efficiency. Among them, solid polymer type fuel cells which use a polymer electrolyte membrane having proton conductivity as an electrolyte have a compact structure and can provide high output, and, furthermore, can be operated in a simple system. Therefore, they are expected as movable electric sources for vehicles.

Solid polymer electrolyte is used for solid polymer type fuel cells. Solid polymer electrolyte is a solid polymer material having proton conductive groups such as sulfonic acid group and carboxylic acid group in the polymer chains. The solid polymer electrolyte is utilized for various uses such as electrodialysis and diffusion dialysis in addition to diaphragms of cells.

In a solid polymer type fuel cell, a pair of electrodes are provided on both sides of a solid polymer electrolyte membrane, and electromotive force is obtained by feeding pure hydrogen or reformed hydrogen gas as a fuel gas to one of the electrodes (fuel-electrode) and oxygen gas or air as an oxidant to another electrode (air electrode).

It is known that in this solid polymer type fuel cell, a peroxide is produced in the catalyst layer formed at the interface of the solid polymer electrolyte membrane and the electrodes by a cell reaction, and the peroxide becomes peroxide radicals while being diffused, which deteriorate the polymer electrolyte.

In order to give radical resistance, it is proposed to add in the polymer electrolyte a phosphorus polymer compound comprising an aromatic polymer compound such as polyphenylene ether in which methylenephosphonic acid group is introduced, namely, a phosphorus polymer compound in which a phosphonic acid group is bonded to an aromatic ring through methylene group (see, e.g., JP-A-2000-11756).

Furthermore, as a solid polymer electrolyte having a stable proton conductivity even under the high temperature conditions of higher than 100° C., there are proposed polymer electrolyte compositions comprising a phosphoric acid derivative and a phosphorus polymer compound comprising an aromatic polymer compound such as polyphenylene ether in which methylenephosphonic acid group is introduced, namely, a phosphorus polymer compound in which a phosphonic acid group is bonded to an aromatic ring through methylene group (see, e.g., JP-A-11-503262).

However, there have been desired such polymer electrolyte compositions having the better radical resistance and/or proton conductivity.

BRIEF SUMMARY OF THE INVENTION

The object of the present invention is to provide a polymer electrolyte composition excellent in radical resistance and/or proton conductivity, and a further object is to provide a polymer electrolyte composition membrane using the above polymer electrolyte composition, and a fuel cell using the polymer electrolyte composition membrane.

As a result of intensive research conducted by the inventors for attaining the above objects, it has been found that a polymer electrolyte composition comprising an aromatic polymer phosphonic acid derivative in which phosphonic acid group or the like is directly bonded to an aromatic ring; and at least on selected from the group consisting of a phosphoric acid derivative and a polymer electrolyte is excellent in radical resistance and/or proton conductivity. Thus, the present invention has been accomplished.

That is, the present invention provides a practically superior polymer electrolyte composition containing an aromatic polymer phosphonic acid derivative represented by the following formula (1); and at least on selected from the group consisting of a phosphoric acid derivative and a polymer electrolyte.

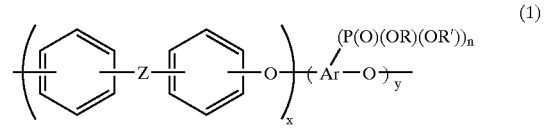

(1)

(in the formula, -Z- represents —$SO_2$— or —CO—, x and y each represent 0.01–0.99 provided that the sum of x and y is 1, —Ar— represents a divalent aromatic group of 4–18 carbon atoms which may contain a hetero atom and may contain one or more substituents, n represents the average number of substituents per unit structure of polymeric moiety containing the aromatic group and is a positive number of 8 or less, and R and R' each independently represent a hydrogen atom or an alkyl group).

The polymer electrolyte composition of the present invention preferably comprises the aromatic polymer phosphonic acid derivative and the polymer electrolyte, preferably the polymer electrolyte has a proton conductivity of not less than $1 \times 10^{-4}$ S/cm. This polymer electrolyte composition shows good film formability as well as excellent radical resistance, and furthermore can be formed into a composite membrane with a porous substrate membrane.

The polymer electrolyte composition of the present invention preferably comprises the aromatic polymer phosphonic acid derivative and the phosphoric acid derivative. This polymer electrolyte composition can be solid polymer electrolyte which shows proton conductivity even under the high-temperature conditions of 100° C. or higher. The solid polymer electrolyte composition containing the phosphoric acid derivative in an amount of not less than 2 equivalents with respect to the number of phosphorus atoms of the aromatic polymer phosphonic acid derivative shows further excellent and stable proton conductivity. The phosphoric acid derivative is preferably represented by the formula (2).

(2)

(wherein R'" represents an alkyl group of 1–6 carbon atoms or an aryl group, k represents 0–2 and when k is 2, the two R'" may be the same or different, and k is preferably 0). This polymer electrolyte composition shows good film formability as well as excellent proton conductivity, and furthermore can be formed into a composite membrane with a porous substrate membrane.

DETAILED DESCRIPTION OF THE INVENTION

The present invention will be explained in more detail below.

The polymer electrolyte composition of the present invention is characterized by containing an aromatic polymer phosphonic acid derivative represented by the aforementioned formula (1).

In the formula (1), -Z- represents —SO$_2$— or —CO—, x and y each represent 0.01-0.99 provided that the sum of x and y is 1, —Ar— represents a divalent aromatic group of 4–18 carbon atoms which may contain a hetero atom and —Ar— may contain one or more substituents, n represents the average number of substituents per unit structure of polymeric moiety containing the aromatic group and is a positive number of 8 or less, and R and R' each independently represent a hydrogen atom or an alkyl group.

As representative examples of —Ar—, mention may be made of the following divalent groups.

Hydrocarbon divalent groups such as o-phenylene, m-phenylene, p-phenylene, naphthalene-1,4-diyl, naphthalene-1,5-diyl, naphthalene-2,6-diyl, naphthalene-2,3-diyl, biphenyl-4,4'-diyl, biphenyl-3,3'-diyl, p-terphenyl-4,4''-diyl, 2,2-diphenylpropane-4',4''-diyl, fluorene-2,7-diyl, and fluorene-3,6-diyl; divalent groups containing heteroatom such as carbazole-2,7-diyl, carbazole-3,6-diyl, thiophene-2,5-diyl, dibenzothiophene-2,7-diyl, furan-2,5-diyl, dibenzofuran-2,7-diyl, dibenzofuran-3,6-diyl, diphenylamine-4,4'-diyl, and diphenyl ether-4,4'-diyl; and the like.

These groups may have one or more substituents, and examples of the substituents include the following groups.

Linear or branched alkyl groups which may be substituted with hydroxyl group or halogen atom, such as methyl, ethyl, 2-propyl, t-butyl, hydroxymethyl and trifluoromethyl; linear or branched alkoxy groups which may be substituted with halogen atom, such as methoxy, ethoxy and trifluoromethoxy; phenyl groups which may be substituted with alkyl, alkoxy, phenyl, phenoxy, halogen atom or sulfonic acid group, such as phenyl, methylphenyl, methoxyphenyl, biphenyl, phenoxyphenyl, chlorophenyl and sulfophenyl; phenoxy groups which may be substituted with alkyl, alkoxy or sulfonic acid group, such as phenoxy, methylphenoxy, methoxyphenyl and sulfophenoxy; alkyloxycarbonyl groups such as ethoxycarbonyl; alkylcarbonyloxy groups such as ethylcarbonyloxy; aminocarboxyl groups or N-alkylaminocarboxyl groups; amino groups in which the nitrogen atom may be substituted with alkyl, such as amino and dimethylamino; halogens such as fluorine, chlorine, bromine and iodine; ureido group; acylamino group; carboxyl group; hydroxyl group; cyano group; sulfonic acid group; aminosulfonyl group; and the like.

Preferred examples of —Ar— in the present invention are phenylene groups which may be substituted, such as o-phenylene(1,2-phenylene), m-phenylene (1,3-phenylene), p-phenylene(1,4-phenylene), 3-methyl-1,2-phenylene, 3-ethyl-1,2-phenylene, 3-methoxy-1,2-phenylene, 3-ethoxy-1,2-phenylene, 3-bromo-1,2-phenylene, 3-chloro-1,2-phenylene, 3,6-dimethyl-1,2-phenylene, 4,5-dibromo-1,2-phenylene, 2-methyl-1,3-phenylene, 2-ethyl-1,3-phenylene, 2-methoxy-1,3-phenylene, 2-ethoxy-1,3-phenylene, 2-bromo-1,3-phenylene, 2-chloro-1,3-phenylene, 5-methyl-1,3-phenylene, 5-bromo-1,3-phenylene, 2-methyl-1,4-phenylene, 2-ethyl-1,4-phenylene, 2-methoxy-1,4-phenylene, 2-ethoxy-1,4-phenylene, 2-bromo-1,4-phenylene, 2-chloro-1,4-phenylene, 2,6-dimethyl-1,4-phenylene, 2,6-dibromo-1,4-phenylene, 2-phenyl-1,4-phenylene, and 2,3-diphenyl-1,4-phenylene; biphenyldiyl groups which may be substituted, such as biphenyl-4,4'-diyl, biphenyl-3,3'-diyl, 3,3'-diphenylbiphenyl-4,4'-diyl, 3,3'-bisphenoxybiphenyl-4,4'-diyl, 3,3'-dichlorobiphenyl-4,4'-diyl, 3,3'-dibromobiphenyl-4,4'-diyl, 2,2'-dichlorobiphenyl-3,3'-diyl, 2,2'-dibromobiphenyl-3,3'-diyl, 4,4'-dichlorobiphenyl-3,3'-diyl and 4,4'-dibromobiphenyl-3,3'-diyl; carbazolediyl groups which may be substituted, such as carbazole-2,2'-diyl, carbazole-3,3'-diyl, N-ethylcarbazole-2,2'-diyl and N-ethylcarbazole-3,3'-diyl; and the like.

Among them, —Ar— is preferably a phenylene group which may be substituted or a biphenyldiyl group which may be substituted, and more preferably m-phenylene, p-phenylene, biphenyl-4,4'-diyl, biphenyl-3,3'-diyl, or the like.

In the formula, x and y mean molar ratio in the copolymer of the respective comonomers used for the preparation of the copolymer, and represents 0.01-0.99, respectively provided that the sum of x and y is 1. Preferably, y is 0.1-0.9.

R and R' each independently represent a hydrogen atom or an alkyl group. Representative examples of the alkyl group are alkyl groups of 1–22 carbon atoms, such as methyl, ethyl, n-propyl, isopropyl, n-butyl, isobutyl, sec-butyl, t-butyl, t-pentyl, isooctyl, t-octyl, 2-ethylhexyl, cyclopentyl, cyclohexyl, cycloheptyl, cyclooctyl, 1-methylcyclopentyl, 1-methylcyclohexyl, 1-methyl-4-isopropylcyclohexyl, nonyl, decyl, undecyl, dodecyl, tridecyl, tetradecyl, pentadecyl, hexadecyl, heptadecyl, octadecyl, nonadecyl, eicosyl, and the like. The R and R' are not limited to these examples.

In the aromatic polymer phosphonic acid derivatives represented by the formula (1), preferably at least one of R and R' is a hydrogen atom, more preferably both of them are hydrogen atoms. Moreover, when R and/or R' are hydrogen atoms, it may be salts or those which are partially converted to salts. In this case, the cations include, for example, alkali metal ion and alkaline earth metal ion, and they are more preferably lithium, sodium and potassium.

The aromatic polymer phosphonic acid derivatives (1) may be random copolymers, alternating copolymers or block copolymers. These can be prepared by a combination of known methods.

Polymerization degree of them is not particularly limited, and usually about 10–10$^4$, and usually about 10$^3$–10$^6$ in molecular weight. If the polymerization degree is less than 10, mechanical strength tends to decrease and problems may be caused in film formability. If it exceeds 10$^4$, the solubility in solvent tends to lower, which may cause problems in processability and moldability such as casting of films. Both are not preferred.

The method for producing the aromatic polymer phosphonic acid derivatives represented by the above formula (1) is not particularly limited, and they can be produced, for example, by the following method.

First, an aromatic polymer compound shown by the following formula (3) is brominated with a brominating agent:

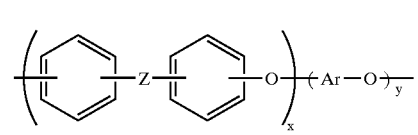

(3)

(wherein -Z-, x, y and —Ar— have the same meanings as defined above). A trialkyl phosphite (P(OR)(OR')(OR'')) is reacted with the resulting brominated product in an organic solvent in the presence of a nickel halide catalyst, whereby an aromatic polymer phosphonic acid derivative (1)(diester form) can be produced. Furthermore, if necessary, the diester is hydrolyzed, whereby an aromatic polymer phosphonic acid derivative (1)(acid form) can be produced. As the compound of the formula (3), there may be used, for example, commercially available products such as Radel (trademark) manufactured by Amoco Polymer Co., Ltd.

First, the step of bromination of the aromatic polymer compound (3) with a brominating agent will be explained.

The bromination step is usually carried out by reacting the aromatic polymer compound (3) with a brominating agent such as bromine or N-bromosuccinimide in an organic solvent. Examples of the organic solvent used here include methylene chloride, chloroform, carbon tetrachloride, acetic acid, a mixed solvent thereof, and the like. Preferably, the organic solvent which highly dissolves the aromatic polymer compound (3) is selected. The reaction can be carried out at room temperature to reflux temperature of the solvent, but, if necessary, the reactants may be cooled to lower than room temperature. Furthermore, a catalyst such as an iron powder may be used.

It is preferred to use N-bromosuccinimide as the brominating agent, and in this case, it is preferred to co-exist a strong acid. Examples of the strong acid include mineral acids such as sulfuric acid and hydrochloric acid and organic acids such as trifluoroacetic acid, and sulfuric acid is preferred. As for the proportion of the strong acid and the organic solvent, the amount in weight of the organic solvent is 0.3–20 times, preferably 5–10 times that of the strong acid. The amount in weight of the organic solvent is usually 5–50 times, preferably 10–30 times that of the aromatic polymer compound. The amount in weight of N-bromosuccinimide is usually 0.1–30 times, preferably 1–10 times that of the aromatic polymer compound. The mixing can be carried out in an optional order. There may be employed a method which comprises previously mixing the strong acid and the organic solvent and adding thereto the aromatic polymer compound and N-bromosuccinimide as a brominating agent, but preferred is a method which comprises gradually adding the strong acid, e.g., sulfuric acid to a solution or slurry of the organic solvent containing the aromatic polymer compound and brominating agent.

In the case of using N-bromosuccinimide, the bromination reaction is usually carried out at 0° C. to 30° C. If the reaction temperature is too high, sometimes, sulfonation reaction sometimes proceeds in the case of using sulfuric acid as the strong acid.

Conventional methods can be used for collecting and purifying a brominated aromatic polymer compound. For example, the brominated aromatic polymer compound may be precipitated by adding a poor solvent or others and the desired product is collected by filtration or other means, followed by washing with water, re-precipitation purification with good solvent and poor solvent, and the like.

In the present specification, a poor solvent means the solvent which does not dissolve or substantially does not dissolve an objective polymer compound, and when the poor solvent is used as a precipitating agent, it should be admixed with a good solvent. Examples of the poor solvent of the brominated aromatic polymer compound include acetone, methanol, water and a mixture thereof, and the like. When water is used, the pH may be adjusted by an acid or a base.

The bromination degree of the aromatic polymer compound can be determined by ordinary means such as NMR measurement and organic elementary analysis.

Next, production of phosphonic acid diester by reaction of the brominated aromatic polymer compound with a trialkyl phosphite will be explained below.

This step is usually carried out in an organic solvent in the presence of a nickel halide catalyst. The organic solvent used here is preferably an amide compound. Examples thereof are N,N-dimethylformamide, N,N-dimethylacetamide, N-methylpyrrolidone, and the like. Among them, N,N-dimethylformamide is especially preferred. In selection of the organic solvents, preferred are those which highly dissolves the brominated aromatic polymer compound used as a substrate. The organic solvent is used in an amount of usually about 3–100 times by weight, preferably 4–20 times by weight that of the brominated aromatic polymer compound.

As the nickel halide catalyst, the compounds of nickel (II) are suitable, and nickel chloride (II) is preferred. The nickel halide catalyst is used in an amount of generally about 1–3 mols, preferably about 1.5–2 mols based on 1 mol of bromo group of the brominated aromatic polymer compound. If the amount is less than 1 mol, amount of residual bromo groups increases.

The trialkyl phosphites (P(OR) (OR') (OR")) include, for example, those which have 1–22 carbon atoms in the alkyl moiety of R, R', R". Among them, preferred are those which have the alkyl moiety of linear or branched alkyls of 4 or less carbon atoms. These alkyls may be the same or different. More preferred trialkyl phosphates are trimethyl phosphite, triethyl phosphite, and the like. The trialkyl phosphite is used in an amount of generally about 1.2–2 mols based on 1 mol of the nickel halide catalyst, and about 1.2–5 mols based on 1 mol of bromo group of the brominated aromatic polymer compound.

The reaction of this step is usually carried out by adding the brominated aromatic polymer compound and the nickel halide catalyst to the organic solvent and stirring the mixture with heating until the reaction mixture turns blue, followed by adding the trialkyl phosphite to the reaction mixture. Preferably, the reaction temperature with the trialkyl phosphite is 90° C. or higher, and more preferably, the reaction is carried out under refluxing when N,N-dimethylformamide is used as the organic solvent. By employing these conditions, conversion of bromo group to phosphonic acid diester can be improved.

The reaction time depends on the kind of the brominated aromatic polymer compound, solvent, temperature, and the like, and the exemplary period is usually about 1–24 hours when the reaction is carried out under refluxing using N,N-dimethylformamide as the solvent.

When an aromatic polymer phosphonic acid derivative (1)(diester form) is collected from the reaction mixture and is purified, a conventional method can be used. For example, the phosphonic acid diester may be precipitated by adding a poor solvent or others and the desired product is collected by filtration or other means, followed by washing with water, re-precipitation purification with good solvent and poor solvent, and the like.

Next, method for producing an aromatic polymer phosphonic acid derivative (1) (acid form) by hydrolyzing the aromatic polymer phosphonic acid derivative (1) (diester form) will be explained below.

The hydrolysis of the phosphonic acid diester may be carried out after isolating the phosphonic acid diester from the reaction mixture or may be carried out by successively adding a hydrolyzing agent to the reaction mixture. The hydrolysis can be carried out by various known methods.

For example, there are (1) a method of mixing an aqueous solution of sodium hydroxide, potassium hydroxide, or the like with a phosphonic acid diester dissolved or partially dissolved in an amide solvent or an ether solvent, and heating the mixture, (2) a method of reacting a phosphonic acid diester with a trialkylsilyl halide such as trimethylsilyl iodide and then adding water to perform hydrolysis (Tetrahedron Lett. No.2, 1977, 155–158, J. C. S. Chem. Comm., 1978, 870–871), (3) a method of carrying out the hydrolysis using an aqueous solution of an acid, and the like. In the method (1), a monohydrolyzate of the diester (a phosphonic acid monoester in the case of R″ being an alkyl group) is mainly obtained, and in the methods (2) and (3), phosphonic acid is mainly obtained (in the case of R″ being hydrogen).

As the hydrolysis method (1), there may be exemplified a method of mixing an aqueous solution containing an alkali in an amount of 1 mol or more, usually, in large excess amount as the phosphonic acid ester group-reduced value with a mixed solution obtained by dissolving or partially dissolving the phosphonic acid diester in an amide solvent or an ether solvent in such a manner that the phosphonic acid diester is at least partially dissolved, and carrying out the hydrolysis at a reflux temperature of the mixture.

As the hydrolysis method (2), there may be exemplified a method of cooling a mixed solution obtained by dissolving or partially dissolving the phosphonic acid diester in an amide solvent or an ether solvent at about −50° C. to room temperature, adding to the mixed solution a trialkyl halide in an amount of about 2–10 mols as the phosphonic acid-reduced value, and then keeping the mixture at about 0–100° C., followed by adding water and keeping at 0–100° C. Of course, this method may be a method in which the trialkyl-silyl halide is once reacted and the reaction product is once isolated, followed by hydrolyzing in water or a mixed solution of water and an organic solvent.

As the hydrolysis method (3), there may be exemplified a method of stirring, at room temperature to a reflux temperature, preferably 80° C. to a reflux temperature, a mixed solution in the form of slurry obtained by dissolving or suspending the phosphonic acid diester in a solvent containing an aqueous hydrochloric acid solution. Examples of the solvent containing the aqueous hydrochloric acid solution are 10–35% aqueous hydrochloric acid solution and a mixed solvent comprising the aqueous solution and other solvents. As the other solvents, mention may be made of alcohols, ketones, and aprotic solvents such as dimethyl sulfoxide and N,N-dimethylformamide, and the like.

The resulting aromatic polymer phosphonic acid derivative (1) (monoester form and/or acid form) can be collected from the reaction mixture by a conventional method. For example, the desired product can be recovered by precipitating the phosphonic acid (1) by adding a poor solvent and then filtrating off the product or the like. Furthermore, if necessary, purification can be carried out by a conventional purification method such as washing with water or re-precipitation purification with good solvent and poor solvent, and the like.

Thus, the desired aromatic polymer phosphonic acid derivatives (1) are produced.

These aromatic polymer phosphonic acid derivatives (1) may be in the form of salts or partial salts, and in this case, the possible cations include, for example, alkali metal ions and alkaline earth metal ions, and lithium, sodium and potassium are especially preferred.

The polymer electrolyte composition of the present invention comprises an aromatic polymer phosphonic acid derivative represented by the above formula (1); and at least one selected from the group consisting of a phosphoric acid derivative and a polymer electrolyte, preferably comprises an aromatic polymer phosphonic acid derivative represented by the above formula (1); and a phosphoric acid derivative or a polymer electrolyte.

Here, as the polymer electrolyte, there are used polymer compounds having proton conductive groups such as sulfonic acid group and carboxylic acid group in the polymer chains. The proton conductivity of the polymer electrolyte is usually not less than $1 \times 10^{-4}$ S/cm, preferably about $1 \times 10^{-3}$ ~1 S/cm.

Representative examples of the polymer electrolytes are (A) polymer electrolytes comprising a polymer in which the main chain comprises an aliphatic hydrocarbon and into which a sulfonic acid group and/or a phosphonic acid group is introduced; (B) polymer electrolytes comprising a polymer in which the main chain comprises an aliphatic hydrocarbon where a part of hydrogen atoms are substituted with fluorine and into which a sulfonic acid group and/or a phosphonic acid group is introduced; (C) polymer electrolytes comprising a polymer in which the main chain has aromatic ring and into which a sulfonic acid group and/or a phosphonic acid group is introduced; (D) polymer electrolytes comprising a polymer in which the main chain contains substantially no carbon atoms such as polysiloxane and polyphosphazene and into which a sulfonic acid group and/or a phosphonic acid group is introduced; (E) polymer electrolytes comprising a copolymer which comprises two or more repeating units selected from repeating units constituting the polymer in (A)–(D) before introduction of the sulfonic acid group and/or the phosphonic acid group, and into which a sulfonic acid group and/or a phosphonic acid group is introduced; (F) polymer electrolytes which contain nitrogen atom in the main chain or side chain and into which an acidic compound such as sulfuric acid or phosphoric acid is introduced through ionic bonding; and the like.

Examples of the polymer electrolytes (A) are polyvinylsulfonic acid, polystyrenesulfonic acid, poly(α-methylstyrene)sulfonic acid, and the like.

Examples of the electrolytes (B) are sulfonic acid-form polystyrene-graft-ethylene-tetrafluoroethylene copolymer (ETFE, see, for example, JP-A-9-102322) comprising a main chain prepared by copolymerization of a fluorocarbon-type vinyl monomer and a hydrocarbon vinyl monomer and a hydrocarbon side chain having a sulfonic acid; sulfonic acid-form poly(trifluorostyrene)-graft-ETFE membrane which is a solid polymer electrolyte membrane prepared by graft polymerizing α,β,β-trifluorostyrene on a membrane prepared by copolymerizing fluorocarbon-type vinyl monomer with a hydrocarbon-type vinyl monomer and introducing therein a sulfonic acid (see, for example, U.S. Pat. No. 4,012,303 and U.S. Pat. No. 4,605,685); and the like.

The polymer electrolytes (C) may be the polymer electrolytes in which the main chain is interrupted with a hetero-atom such as oxygen atom, and examples thereof are homopolymers such as polyether ketone, polysulfone, polyether sulfone, poly (arylene ether), polyimide, poly((4-phenoxybenzoyl)-1,4-phenylene), polyphenylene sulfide and polyphenylquinoxalene into which a sulfonic acid group is introduced; sulfoarylated polybenzimidazole; sulfoalkylated polybenzimidazole; phosphoalkylated polybenzimidazole (see, for example, JP-A-9-110982); phosphonated poly (phenylene ether) (see, for example, J. Appl. Polym. Sci., 18, 1969 (1974)); and the like.

Examples of the polymer electrolytes (D) are polyphosphazenes into which a sulfonic acid group is introduced, polysiloxanes having a phosphonic acid group disclosed in Polymer Prep., 41, No.1, 70(2000), and the like.

The electrolytes (E) may be random copolymers into which a sulfonic acid group and/or a phosphonic acid group are introduced, alternating copolymers into which a sulfonic acid group and/or a phosphonic acid group are introduced, or block copolymers into which a sulfonic acid group and/or a phosphonic acid group are introduced. Examples of the random copolymers into which a sulfonic acid group is introduced are sulfonated polyether sulfone-dihydroxybiphenyl copolymers (see, for example, JP-A-11-116679).

Examples of the polymer electrolytes (F) are polybenzimidazoles containing phosphoric acid group, and the like (see, for example, JP-A-11-503262).

In the block copolymers included in the polymer electrolytes (E), examples of blocks having a sulfonic acid group and/or a phosphonic acid group are blocks having a sulfonic acid group and/or a phosphonic acid group disclosed in JP-A-2001-250567.

The preferred polymer electrolyte compositions of the present invention are those which comprise the above polymer electrolyte containing the above aromatic polymer phosphonic acid derivative represented by the formula (1). Content of the aromatic polymer phosphonic acid derivative is usually 0.1–99.9% by weight, preferably 0.2–90% by weight, more preferably 0.3–80% by weight, further preferably 0.4–70% by weight, most preferably 0.5–60% by weight based on the electrolyte. If the content of the aromatic polymer phosphonic acid derivative represented by the formula (1) is too low, the effect of improving the radical resistance of the polymer electrolyte composition membrane given by the addition of the aromatic polymer phosphonic acid derivative represented by the formula (1) is small. If it is too high, sufficient proton conductivity may not be developed in using it as a polymer electrolyte composition membrane of fuel cells.

Method for adding the aromatic polymer phosphonic acid derivative is not particularly limited, and for example, there are a method of simply mixing the aromatic polymer phosphonic acid derivative represented by the formula (1) in solid state and the polymer electrolyte in solid state, a method of dissolving the aromatic polymer phosphonic acid derivative represented by the formula (1) in a solution of the polymer electrolyte, and a method of mixing the aromatic polymer phosphonic acid derivative represented by the formula (1) previously dissolved or dispersed in a solvent with a solution of the polymer electrolyte.

In preparing a solution of a composition comprising the aromatic polymer phosphonic acid derivative represented by the formula (1) and the polymer electrolyte, additives may be further added for the purpose of enhancing uniformity of the solution. The additives may be any additives as long as they have an effect to enhance the uniformity of the solution and do not hinder the attainment of the object of the present invention. As one example, acids such as hydrochloric acid, sulfuric acid and phosphoric acid can be used as the additives.

Furthermore, in preparing the polymer electrolyte composition of the present invention, there may be added additives generally used for polymers, such as plasticizers, stabilizers, releasing agents, and antioxidants in such an amount as not hindering the attainment of the object of the present invention.

Moreover, in preparing the polymer electrolyte composition of the present invention or in processing or molding it into the membrane, intermolecular cross-linked structure can be introduced as long as the attainment of the object of the present invention is not hindered. The intermolecular cross-linked structure here means that the polymer chains are linked to each other by chemical bonding, and this can be introduced by irradiating the polymer electrolyte composition with ray sources such as electronic rays, radiation rays and ultraviolet rays. In this case, a known cross-linking agent can be optionally used.

In the case of applying the polymer electrolyte composition of the present invention to fuel cells, it is preferred that the composition is processed to in the form of a membrane. The method of converting the composition to a polymer electrolyte composition membrane has no special limitation, and preferred is a method of forming a membrane from a solution (solution casting method).

Specifically, the polymer electrolyte composition membrane is produced by dissolving the aromatic polymer phosphonic acid derivative represented by the formula (1) and the polymer electrolyte in a suitable solvent, casting the solution on a glass plate and removing the solvent. The solvent used for the membrane formation has no special limitation as long as it can dissolve the aromatic polymer phosphonic acid derivative and the polymer electrolyte, and suitably usable are aprotic polar solvents such as N,N-dimethylformamide dimethylformamide, N,N-dimethylacetamide, N-methyl-2-pyrrolidone and dimethyl sulfoxide, chlorinated solvents such as dichloromethane, chloroform, 1,2-dichloroethane, chlorobenzene and dichlorobenzene, alcohols such as methanol, ethanol and propanol, and alkylene glycol monoalkyl ethers such as ethylene glycol monomethyl ether, ethylene glycol monoethyl ether, propylene glycol monomethyl ether and propylene glycol monoethyl ether. These may be used each alone or in combination of two or more. Among them, dimethylformamide, dimethylacetamide, N-methylpyrrolidone, dimethyl sulfoxide, and the like are preferred because they are high in dissolvability of polymers.

In using the polymer electrolyte composition of the present invention for fuel cells, it can be used in the form of a polymer composite membrane comprising the polymer electrolyte composition and a substrate.

The substrate here is a matrix impregnated with the polymer electrolyte composition, and is used mainly for improving strength, flexibility and endurance of the polymer electrolyte composition. Therefore, any substrates which satisfy the object of use can be used irrespective of shapes, namely, fibrils, porous membranes and others or materials of the substrates. However, when the polymer electrolyte composition is to be satisfactorily used as a diaphragm of solid polymer electrolyte type fuel cells, the porous membrane is very effective.

The shape of the porous membrane used for the above purpose is such that the thickness is usually 1–100 $\mu$m, preferably 3–30 $\mu$m, more preferably 5–20 $\mu$m, the pore diameter is usually 0.01–10 $\mu$m, preferably 0.02–7 $\mu$m, and the porosity is usually 20–98%, preferably 30–95%. If the thickness of the porous substrate membrane is too thin, the reinforcing effects of increasing the strength of the polymer composite membrane or imparting flexibility or endurance are insufficient, and leakage of gas (cross leakage) is apt to occur. If the thickness is too thick, electric resistance is high, and the resulting polymer composite membrane is not preferred as a diaphragm of solid polymer type fuel cells. If the pore diameter is too small, impregnation with the polymer electrolyte composition is very difficult, and if it is too large, the reinforcing effects of the polymer electrolyte composition tend to lower. If the porosity is too low, the resistance as a polymer composite membrane increases, and if it is too high, the strength of the polymer composite membrane per se decreases to result in reduction of the reinforcing effects.

Materials of the porous substrate membrane are preferably aliphatic polymers or fluorine-containing polymers from the viewpoints of heat resistance and reinforcing effects on physical strength.

Examples of the suitable aliphatic polymers are polyethylenes, polypropylenes, ethylene-propylene copolymers, and the like, but the aliphatic polymers are not limited to these examples. The polyethylenes here mean ethylene polymers having a crystal structure of polyethylene, and include, for example, copolymers of ethylene with other monomers, and, specifically, include copolymers of ethylene with α-olefins, which is called straight chain low-density polyethylene (LLDPE). The polypropylenes here are propylene polymers having a crystal structure of polypropylene, and include generally used propylene block copolymers and random copolymers (copolymers with ethylene, 1-butene, or the like).

The fluorine-containing polymers are known thermoplastic resins having at least one carbon-fluorine bond in the molecule. Generally, there are used aliphatic polymers having a structure in which all or most of the hydrogen atoms are substituted with fluorine atoms.

Examples of suitable fluorine-containing polymers are polytrifluoroethylene, polytetrafluoroethylene, polychlorotrifluoroethylene, poly(tetrafluoroethylene-hexafluoropropylene), poly(tetrafluoroethylene-perfluoroalkyl ether), polyvinylidene fluoride, etc., but the fluorine-containing polymers are not limited to these examples. Among them, polytetrafluoroethylene and poly(tetrafluoroethylene-hexafluoropropylene) are preferred, and polytetrafluoroethylene is especially preferred in the present invention. These fluorine-containing resins are preferably those which have an average molecular weight of not less than 100,000 from the viewpoint of mechanical strength.

When the membrane of the polymer electrolyte composition or the polymer composite membrane is used in fuel cells, thickness of the membrane is not particularly limited, but is preferably 3–200 μm, more preferably 4–100 μm, further preferably 5–50 μm. If the thickness is too thin, strength of the membrane tends to decrease, and if it is too thick, the membrane is high in electrical resistance and is not preferred as a diaphragm of solid polymer type fuel cells. The thickness of the membrane can be controlled by suitably selecting the concentration of the solution of the polymer electrolyte composition, coating amount of the solution, thickness of the porous substrate membrane and coating thickness on the porous substrate membrane.

The polymer electrolyte composition of the present invention preferably contains the aromatic polymer phosphonic acid derivative (1) and the phosphoric acid derivative, preferably the phosphoric acid derivative represented by the following formula (2).

$$O=P(OR''')_k(OH)_{3-k} \quad (2)$$

In the formula (2), R''' represents an alkyl group of 1–6 carbon atoms or an aryl group, k represents 0–2, and when k is 2, the two R''' may be the same or different, and k is preferably 0 or 1, more preferably 0. When k is 1 or 2, R''' is preferably an alkyl group.

Examples of the alkyl group are linear or branched alkyl groups or cyclic alkyl groups such as methyl, ethyl, propyl, isopropyl, n-butyl, isobutyl, sec-butyl, pentyl, cyclopentyl, hexyl, and cyclohexyl. The alkyl groups may have one or more substituents such as halogen atom, amino group or hydroxyl group.

As examples of the aryl group, mention may be made of phenyl, alkyl-substituted phenyl groups such as tolyl, ethylphenyl and isopropylphenyl, halogen-substituted phenyl groups such as bromophenyl and chlorophenyl, naphthyl group, anthryl group, phenanthryl group, nitrophenyl group, etc.

Examples of the phosphoric acid derivatives in which R''' is an alkyl group and k is 1 are monomethyl phosphate, monoethyl phosphate, mono-n-propyl phosphate, monoisopropyl phosphate, mono-n-butyl phosphate, monoisobutyl phosphate, mono-sec-butyl phosphate, mono-tert-butyl phosphate, mono-n-pentyl phosphate, mono (1-methylbutyl) phosphate, mono (2-methylbutyl) phosphate, mono (3-methylbutyl) phosphate, mono(1,1-dimethylpropyl) phosphate, mono(2,2-dimethylpropyl) phosphate, mono (1, 2-dimethylpropyl) phosphate, mono-n-hexyl phosphate, mono (2-methylpentyl) phosphate, mono (3-methylpentyl) phosphate, etc.

Examples of the phosphoric acid derivatives in which R''' is an alkyl group and k is 2 are dimethyl phosphate, diethyl phosphate, di-n-propyl phosphate, diisopropyl phosphate, di-n-butyl phosphate, diisobutyl phosphate, di-sec-butyl phosphate, di-tert-butyl phosphate, di-n-pentyl phosphate, di (1-methylbutyl) phosphate, di (2-methylbutyl) phosphate, di (3-methylbutyl) phosphate, di (1,1-dimethylpropyl) phosphate, di (2,2-dimethylpropyl) phosphate, di (1,2-dimethylpropyl) phosphate, di-n-hexyl phosphate, di(2-methylpentyl) phosphate, di (3-methylpentyl) phosphate, etc.

In the case of k being 1 or 2, monomethyl phosphate, monoethyl phosphate, mono-n-propyl phosphate, monoisopropyl phosphate, dimethyl phosphate, diethyl phosphate, di-n-propyl phosphate, diisopropyl phosphate and mixtures thereof are preferred, monoethyl phosphate, mono-n-propyl phosphate, monoisopropyl phosphate, diethyl phosphate, di-n-propyl phosphate, diisopropyl phosphate and mixtures thereof are more preferred, and monoisopropyl phosphate, diisopropyl phosphate and mixtures thereof are especially preferred from the point of proton conductivity.

Examples of the phosphoric acid derivatives in which R''' is an aryl group and k is 1 are monophenyl phosphate, monotolyl phosphate, monoethylphenyl phosphate, monoisopropylphenyl phosphate, mononaphthyl phosphate, monoanthryl phosphate, monophenanthryl phosphate, mononitrophenyl phosphate, monochlorophenyl phosphate, monobromophenyl, etc.

Examples of the phosphoric acid derivatives in which R''' is an aryl group and k is 2 are diphenyl phosphate, ditolyl phosphate, di(ethylphenyl) phosphate, di(isopropylphenyl) phosphate, dinaphthyl phosphate, dianthryl phosphate, diphenanthryl phosphate, di(nitrophenyl) phosphate, di(chlorophenyl) phosphate, di(bromophenyl) phosphate, etc.

When k is 0, the formula (2) shows orthophosphoric acid.

The above-mentioned phosphoric acid derivative (2) is generally used in an amount of 0.1–10 equivalents based on the number of phosphorus atoms of the aromatic polymer phosphonic acid derivative (1), and use of the phosphoric acid derivative (2) in an amount of 2 equivalents or more is preferred, and in this case, a high and stable proton conductivity is exhibited. More preferred is 2–5 equivalents.

When the polymer electrolyte composition of the present invention is used in fuel cells, generally, it is used in the form of a membrane. As the method for obtaining the membrane by allowing the phosphoric acid derivative to be contained in the aromatic polymer phosphonic acid derivative, there are (1) a method of adding the phosphoric acid derivative to a solution of the aromatic polymer phosphonic acid derivative, casting the solution and the volatilizing the solvent, (2) a method of casting a solution of the aromatic polymer phosphonic acid derivative which does not contain the phosphoric acid derivative and dipping the resulting film of the polymer electrolyte in a solution of the phosphoric acid derivative, and other methods. The method (2) is preferred because this method is simple.

According to the method (1), a film comprising the aromatic polymer phosphonic acid derivative in which the phosphoric acid derivative is contained can be produced by adding the phosphoric acid derivative to a solution of the aromatic polymer phosphonic acid derivative, casting the solution on a glass plate or the like to form a film, and then removing the solvent. The thickness of the film is not particularly limited, and is preferably 10–200 $\mu$m. The thickness is preferably thicker than 10 $\mu$m in order to obtain a strength enough to stand practical use, and it is preferably thinner than 200 $\mu$m in order to reduce the membrane resistance, namely, improve the electricity generating performance. The thickness can be controlled by concentration of the solution or coating thickness on the base.

The solvents of the solution of the aromatic polymer phosphonic acid derivative are not particularly limited as long as they can dissolve the polymer phosphonic acid derivative and can be removed later. As examples thereof, mention may be made of aprotic polar solvents such as N,N-dimethylformamide, N,N-dimethylacetamide, N-methyl-2-pyrrolidone and dimethyl sulfoxide, chlorinated solvents such as dichloromethane, chloroform, 1,2-dichloroethane, chlorobenzene and dichlorobenzene, alcohols such as methanol, ethanol and propanol, alkylene glycol monoalkyl ethers such as ethylene glycol monomethyl ether, ethylene glycol monoethyl ether, propylene glycol monomethyl ether and propylene glycol monoethyl ether, and water. These can be used each alone, and if necessary, they can be used in combination of two or more.

Concentration of the aromatic polymer phosphonic acid derivative solution before the addition of the phosphoric acid derivative may vary depending on the aromatic polymer phosphonic acid derivative, solvent and phosphoric acid derivative, but is usually 2–50 parts by weight, preferably 5–30 parts by weight based on 100 parts by weight of the solvent.

If the concentration is too low, viscosity of the solution is too low and control of the thickness tends to become difficult, and if it is too high, the viscosity is too high and preparation of uniform membrane tends to become difficult.

The solvents for the phosphoric acid derivatives in the method (2) are not particularly limited as long as they do not dissolve the aromatic polymer phosphonic acid derivatives and can dissolve the phosphoric acid derivatives, and can be removed later, and among them, volatile solvents such as methanol, ethanol, n-hexane and tetrahydrofuran, water, etc. are preferred because they can be easily removed. In the method (2), amount of the phosphoric acid derivative introduced into the membrane can be controlled by changing the concentration of the phosphoric acid derivative solution, the temperature of the solution, the dipping time in the phosphoric acid derivative solution or the kind of the solvent used.

The concentration of the phosphoric acid derivative solution is usually 5–100% by weight, and preferably 20–100% by weight from the point of assuring the introduction which contributes to the improvement of the proton conductivity.

The dipping temperature is preferably 0–100° C., and more preferably 20–40° C. from the point of inhibiting the volatilization of the solvent during the dipping treatment.

If necessary, the polymer electrolyte composition membrane of the present invention may be made a composite membrane together with a porous substrate membrane from the viewpoint of mechanical strength of the membrane. The porous substrate membranes used are not particularly limited, but suitable are those which are made of polyethylene, polypropylene, polytetrafluoroethylene, etc. and have a porosity of 30% or more and a thickness of 100 $\mu$m or less. Moreover, various known additives such as antioxidants may be added as long as they do not hinder the attainment of the object of the present invention.

The fuel cell of the present invention will be explained.

The fuel cell of the present invention uses the membrane obtained by using the polymer electrolyte composition of the present invention, and can be produced by bonding a catalyst and an electroconductive substance as a current collector onto both sides of the membrane.

The catalysts used are not particularly limited as long as they can activate the redox reaction with hydrogen or oxygen, and known catalysts can be used. Among them, platinum fine particles are preferred. The platinum fine particles are preferably supported on particulate or fibrous carbon such as active carbon or graphite.

Known materials can be used as the electroconductive materials as current collectors, and porous carbon woven fabric and carbon paper are preferred because they efficiently transport the raw gas to the catalyst.

As the method for bonding platinum fine particles or carbon on which the platinum fine particles are supported to the porous carbon woven fabric or carbon paper and the method for bonding them to the polymer electrolyte composition film, there may be employed known methods such as those disclosed, for example, in J. Electrochem. Soc.: Electrochemical Science and Technology, 1988, 135 (9), 2209.

EXAMPLES

The present invention will be explained by the following examples, which should not be construed as limiting the invention in any manner.

The evaluation of characteristics used in the examples is explained below.

Evaluation of Radical Resistance

A polymer membrane was immersed in an aqueous solution containing 3% aqueous hydrogen peroxide and 0.25 ppm of ferrous chloride at 90° C., and after lapse of 20 minutes, change in weight of the membrane was weighed, thereby conducting the evaluation of oxidation resistance. The weight retention rate (%) is shown by "weight of the membrane after immersion for 20 minutes/weight of the membrane before immersion×100 (%)".

Measurement of Proton Conductivity

The measurement of proton conductivity in Examples 8 and 9 and Comparative Example 6 was conducted under the following conditions.

The proton conductivity was measured by alternating current impedance method using model SI1260 high-performance IMPEDANCE/GAIN-PHASE ANALYZER manufactured by Solartoron Co., Ltd. and model 1287 potentiostat (ELECTROCHEMICAL INTERFACE) manufactured by Solartoron Co., Ltd. under the conditions of 80° C. and 90% RH in a thermo-hygrostat. The unit is S/cm.

Measurement of Proton Conductivity

The measurement of proton conductivity in Examples 10–13 was conducted under the following conditions.

The proton conductivity was measured by alternating current impedance method using model SI1260 high-performance IMPEDANCE/GAIN-PHASE ANALYZER manufactured by Solartoron Co., Ltd. and model 1287 potentiostat (ELECTROCHEMICAL INTERFACE) manufactured by Solartoron Co., Ltd. at 120° C. in a hygrostat without moistening. The unit is S/cm.

Evaluation of Fuel Cell Characteristics

On both surfaces of a polymer membrane were bonded a platinum catalyst supported on a fibrous carbon and a porous carbon woven fabric as a current collector, and moistened oxygen gas was allowed to flow through one surface of this unit and moistened hydrogen gas was allowed to flow through another surface to measure electricity generation characteristics of the unit.

Preparation Example 1
[Polymer electrolyte (E1)]

A sulfonated block copolymer was prepared in accordance with Example 1 of JP-A-2001-250567 (US 2001-041,279).

Anhydrous cuprous chloride and 2-methylbenzimidazole were stirred in toluene for 15 minutes at room temperature under the atmosphere. Thereto were added 2-phenylphenol, 4,4'-dihydroxybiphenyl and toluene, followed by stirring at 50° C. under an oxygen atmosphere and then pouring the product into methanol containing hydrochloric acid to precipitate a polymer, which was subjected to filtration and drying to obtain poly(2-phenylphenylene ether). Then, SUMIKA EXCEL PES5003P (hydroxyl-terminated polyether sulfone manufactured by Sumitomo Chemical Co., Ltd.), poly(2-phenylphenylene ether) prepared above, potassium carbonate, N,N-dimethylacetamide (hereinafter referred to as "DMAc") and toluene were charged in a flask equipped with an azeotropic distillation apparatus and were stirred with heating to perform dehydration under azeotropic conditions of toluene and water, and toluene was distilled off, followed by adding 4,4'-difluorobenzophenone and stirring with heating at 160° C. The reaction mixture was added dropwise to a large amount of methanol acidified with hydrochloric acid, and the resulting precipitate was collected by filtration and dried to obtain a block copolymer. The resulting block copolymer was sulfonated by stirring it in 98% sulfuric acid at room temperature to dissolve therein, and added dropwise to ice water to precipitate the copolymer, which was collected by filtration, washed and dried to obtain a sulfonated block copolymer. This polymer had a proton conductivity of $1 \times 10^{-1}$ S/cm. This polymer electrolyte is hereinafter referred to as (E1).

Preparation Example 2
[Polymer Electrolyte (E2)]

A sulfonated polyether sulfone copolymer was prepared in accordance with the process mentioned in Example 3 of JP-A-10-21943 (U.S. Pat. No. 5,985,477).

4,4'-Dihydroxydiphenyl sulfone, 4,4'-dihydroxybiphenyl and 4,4'-dichlorodiphenyl sulfone at a molar ratio of 7:3:10 were subjected to polycondensation using diphenyl sulfone as a solvent at a temperature of 200–290° C. in the presence of potassium carbonate. The resulting polymer was sulfonated with concentrated sulfuric acid to obtain a random copolymer having a sulfonic acid group introduced into the biphenyl unit. This polymer had a proton conductivity of $1 \times 10^{-2}$ S/cm. This polymer electrolyte is hereinafter referred to as (E2).

Preparation Example 3
[An Aromatic Polymer Phosphonic Acid Derivative Represented by the Formula (1) (P1)]

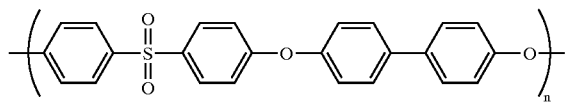

Into a 500 ml flask equipped with a mechanical stirrer were charged 15.0 g of an alternating copolymer (polystyrene reduced molecular weight: $Mn=3.0 \times 10^4$, $Mw=6.8 \times 10^4$, manufactured by Aldrich Chem. Co., Ltd.) having the above described structure (containing 37.5 mmol of unit derived from 4,4'-biphenol), 35.0 g (197 mmol) of N-bromosuccinimide and 202 g of methylene chloride. The mixture was stirred under nitrogen atmosphere. Under ice cooling, 99.6 g of concentrated sulfuric acid was added dropwise to this suspension over 75 minutes. As the result, a sea-laver like product began to precipitate halfway. After completion of addition, the reaction mixture was stirred for one and half hour under ice cooling, poured into ice water and stirred after addition of a small amount of sodium sulfite. The mixture was concentrated with a rotary evaporator under reduced pressure and the obtained aqueous slurry was filtrated. The cake was repeatedly washed with water inserting neutralization treatment and then dried under reduced pressure. Elementary analysis of the obtained polymer revealed that about 2.1 atoms of Br was substituted per one unit derived from 4,4'-biphenol.

Elementary Analysis, Found: C, 46.7%; H, 2.6%; S, 5.4%; Br, 29.1%. Calculated for 2.1 Br Substitution: C, 50.9%; H, 2.5%; S, 5.6%; Br, 29.6%.

Into 183 g of N,N-dimethylformamide was dissolved 7.0 g of the brominated polymer (bromo group content: 26.0 mmol) obtained above. To this was added 5.11 g (39.4 mmol) of nickel (II) chloride and the mixture was stirred under nitrogen atmosphere. The mixture was heated and then 7.71 g (46.4 mmol) of triethyl phosphite was added dropwise thereto at an oil-bath temperature of 130° C. over 10 minutes. The temperature was elevated up to the refluxing temperature over 20 minutes and, after one and half hour, 2.66 g (16.0 mmol) of triethyl phosphite was additionally added dropwise thereto. After stirring further 2 hours under reflux, the reaction mixture was poured into ice water and filtered. The cake was washed with diluted hydrochloric acid, with repeating water, with diluted aqueous sodium hydrogen carbonate solution for neutralization and lastly with water. Upon drying under reduced pressure, 5.63 g of polymer phosphonic acid diethyl ester was obtained.

To 200 ml of 21% aqueous hydrochloric acid solution was added 10.2 g of the polymer phosphonic acid diethyl ester, and the mixture was stirred for 8 hours with heating under refluxing under nitrogen atmosphere.

The suspension was allowed to cool, filtered, washed with water and dried in vacuum. The obtained crude product was dissolved in N,N-dimethylformamide and a large excess of 5% hydrochloric acid was added to the obtained solution to cause re-precipitation. The cake was filtered, repeatedly washed with water and dried under reduced pressure to give 9.1 g of a polymer.

Analysis of the polymer revealed that the polymer had a unit structure (about 0.1 atoms of Br and about 1.3 groups of phosphonic acid were substituted per one unit derived from 4,4'-biphenol) represented by the following structure. By calculation, 2.55 mmol of P atom was present per 1 g of the polymer and the ion exchange capacity was 5.1 meq/g. Hereinafter, the polymer is referred to as (P1).

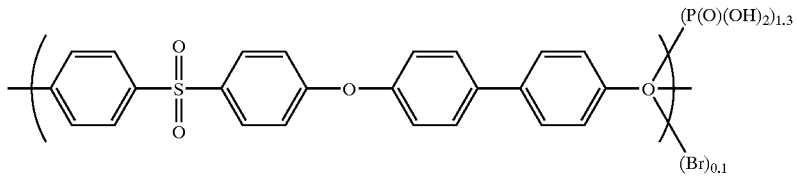

Elementary Analysis: P: Found, 7.6% (Calculated, 7.9%). Br: Found, 1.3% (Calculated, 1.6%). $^1$H-NMR (300 MHz, DMSO-d6): 7.0–8.2 ppm (aromatic hydrogen).

Preparation Example 4
[A Phosphorus Polymer Compound Comprising an Aromatic Polymer Compound to which a Phosphonic Acid Derivative Group is Bonded through a Methylene Group (P2)]

A phosphorus polymer compound represented by the following formula (P2) was obtained in accordance with a known process (e.g., J. Appl. Polym. Sci., 1974, vol. 18, 1969).

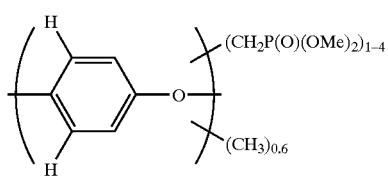

(P2)

$^1$H-NMR (300 MHz, CDCl$_3$) 2.1 ppm area ratio 1.8 (Ar—CH$_3$, 0.6×3) 3.0 ppm area ratio 2.8 (—CH$_2$—P, 1.4×2) 3.6 ppm area ratio 8.4 (—OCH$_3$, 1.4×6) 6.7–7.1 ppm area ratio 2.0 (Ar—H)

Examples 1–4
[Production of a Polymer Membrane Comprising the Polymer Electrolyte (E1) and the Polymer (P1)]

E1 was dissolved in DMAc (N,N-dimethylacetamide) to prepare a solution A having a concentration of E1 of 15% by weight. The solution A, P1, DMAc and aqueous hydrochloric acid solution of 10 mol/L were mixed well in the mixing amounts as shown in Table 1 and the mixture was coated and spread on a glass plate. The solvent was removed by drying under normal pressure to obtain the desired polymer electrolyte composition membrane. All of the polymer membranes had uniform appearance. The results of evaluation conducted on radical resistance are shown in Table 2.

TABLE 1

| Example | Solution A | P1 | DMAc | Aqueous hydrochloric acid solution of 10 mol/L |
|---|---|---|---|---|
| Example 1 | 3000 mg | 50 mg | 950 mg | 100 mg |
| Example 2 | 2333 mg | 150 mg | 1517 mg | 100 mg |
| Example 3 | 1000 mg | 150 mg | 2850 mg | 100 mg |
| Example 4 | 1000 mg | 350 mg | 2650 mg | 100 mg |

Comparative Example 1
[Production of a Polymer Membrane Comprising only the Polymer Electrolyte (E1)]

The solution A was coated and spread on a glass plate. The solvent was removed by drying under normal pressure to obtain the desired polymer membrane. The evaluation on radical resistance was conducted and the results are shown in Table 2.

Comparative Example 2
[Production of a Polymer Membrane Comprising the Polymer Electrolyte (E1) and the Polymer (P2)]

The desired polymer electrolyte composition membrane was obtained in the same manner as Example 3, except that P2 was used in place of P1. The evaluation on radical resistance was conducted and the results are shown in Table 2.

TABLE 2

| Example | Polymer electrolyte | Additive | Weight retention rate |
|---|---|---|---|
| Example 1 | E1 | P1 | 98% |
| Example 2 | E1 | P1 | 98% |
| Example 3 | E1 | P1 | 98% |
| Example 4 | E1 | P1 | 99% |
| Comparative Example 1 | E1 | — | 83% |
| Comparative Example 2 | E1 | P2 | 87% |

Example 5
[Production of a Polymer Membrane Comprising the Polymer Electrolyte (E2) and the Polymer (P1)]

The desired polymer electrolyte composition membrane was obtained in the same manner as Example 2, except that E2 was used as the polymer electrolyte. The evaluation on radical resistance was conducted and the results are shown in Table 3.

Comparative Example 3
[Production of a Polymer Membrane Comprising only the Polymer Electrolyte (E2)]

E2 was dissolved in DMAc to prepare a solution B having a concentration of E2 of 15% by weight. The solution B was coated and spread on a glass plate. The solvent was removed by drying under normal pressure to obtain the desired polymer electrolyte composition membrane. The evaluation on radical resistance was conducted and the results are shown in Table 3.

Example 6
[Production of a Polymer Composite Membrane using a Polymer Electrolyte Composition Comprising the Polymer Electrolyte (E1) and the Polymer (P1), and a Polytetrafluoroethylene Porous Substrate Membrane]

A polytetrafluoroethylene porous substrate membrane (thickness 15 μm, porosity 90%, pore diameter 3.0 μm) was used as the porous membrane. The porous membrane was fixed on a glass plate. A mixed solution comprising solution A which was used in Example 1, P1, DMAc and aqueous hydrochloric acid solution of 10 mol/L was uniformly coated and spread on the porous membrane. The above solution penetrated into the Teflon (trademark for the product manufactured by Du Pont de Nemours, E.I. & Co.) porous membrane and reached the glass plate on the back, and, as a result, the opaque Teflon porous membrane appeared transparent. This was dried under normal pressure to obtain the desired polymer membrane. The evaluation on radical resistance was conducted and the results are shown in Table 3.

Comparative Example 4

[(Production of a Polymer Composite Membrane using the Polymer Electrolyte (E1) and a Polytetrafluoroethylene Porous Substrate Membrane]

A polymer membrane was obtained in the same manner as in Example 6, except that the polymer (P1) was not used. The evaluation on radical resistance was conducted and the results are shown in Table 3.

Example 7

[Production of a Polymer Composite Membrane using a Polymer Electrolyte Composition Comprising the Polymer Electrolyte (E1) and the Polymer (P1) and a Polyethylene Porous Substrate Membrane]

A polymer membrane was obtained in the same manner as in Example 6, except that a polyethylene porous substrate membrane (thickness 9 μm, porosity 36%, pore diameter 0.04 μm) was used as the porous membrane. The evaluation on radical resistance was conducted and the results are shown in Table 3.

Comparative Example 5

[Production of a Polymer Composite Membrane Comprising the Polymer Electrolyte (E1) and a Polyethylene Porous Substrate Membrane]

A polymer membrane was obtained in the same manner as in Example 7, except that the polymer (P1) was not used. The evaluation on radical resistance was conducted and the results are shown in Table 3.

TABLE 3

| Example | Polymer electrolyte | Aromatic polymer phosphonic acid derivative | Substrate | Weight retention rate (%) |
| --- | --- | --- | --- | --- |
| Example 5 | E2 | P1 | — | ~100 |
| Comparative Example 3 | E2 | — | — | 90 |
| Example 6 | E1 | P1 | Polytetrafluoroethylene | 99 |
| Comparative Example 4 | E1 | — | Polytetrafluoroethylene | 88 |
| Example 7 | E1 | P1 | Polyethylene | 99 |
| Comparative Example 5 | E1 | — | Polyethylene | 93 |

Examples 8 and 9 and Comparative Example 6

Measurement of proton conductivity and evaluation of fuel cell characteristics (repetition of actuation and stopping operations for 1 week) were conducted on the polymer membranes produced in Example 1, Example 6 and Comparative Example 1. The results are shown in Table 4.

TABLE 4

| Example | Polymer membrane | Proton conductivity (S/cm) | Evaluation of fuel cell characteristics |
| --- | --- | --- | --- |
| Example 8 | Example 1 | $9 \times 10^{-2}$ | Deterioration of fuel cell characteristics and gas leakage were not observed. |
| Example 9 | Example 6 | $8 \times 10^{-2}$ | Deterioration of fuel cell characteristics and gas leakage were not observed. |
| Comparative Example 6 | Comparative Example 1 | $9 \times 10^{-2}$ | Gas leakage occurred and deterioration of characteristics was observed. |

Examples 10–13

[Production of a Polymer Electrolyte Composition Membrane Comprising the Polymer (P1) and a Phosphoric Acid Derivative]

As a phosphoric acid derivative commercially available concentrated phosphoric acid (>85 wt %, orthophopshoric acid manufactured by Wako Junyaku Co., Ltd.) was used. P1, the concentrated phosphoric acid and DMAc (N,N-dimethylacetamide) were mixed well in the amounts as shown in Table 5, and the mixture was coated and spread on a glass plate. The solvent was removed by drying under normal pressure to obtain the desired polymer membrane. All of the polymer membranes had uniform appearance. Evaluation on the change of proton conductivity was conducted and the results are shown in Table 6.

TABLE 5

| Example | P1 | Concentrated phosphoric acid | DMAc | Equivalent amount of added orthophosphoric acid with respect to P atom of P1 |
| --- | --- | --- | --- | --- |
| Example 10 | 200 mg | 167 mg | 3.8 g | 2.8 |
| Example 11 | 200 mg | 298 mg | 3.8 g | 5.1 |
| Example 12 | 200 mg | 24 mg | 3.8 g | 0.4 |
| Example 13 | 200 mg | 55 mg | 3.8 g | 0.9 |

TABLE 6

| Elapsed time (min.) | Proton conductivity under conditions of 120° C. without moistening (S/cm) | | | |
| --- | --- | --- | --- | --- |
| | Example 12 | Example 13 | Example 10 | Example 11 |
| 30 | 2.0E−06 | 7.3E−06 | 3.6E−03 | 1.6E−02 |
| 60 | 1.6E−06 | 5.3E−06 | 3.6E−03 | 1.6E−02 |
| 125 | 9.5E−07 | 2.6E−06 | 3.6E−03 | 1.6E−02 |
| 180 | 7.1E−07 | 2.4E−06 | 3.4E−03 | 1.4E−02 |

The polymer electrolyte composition of the present invention comprises an aromatic polymer phosphonic acid derivative in which a phosphonic acid group and others directly bond to the aromatic ring and a polymer electrolyte, and, hence shows excellent radical resistance and proton conductivity. The polymer electrolyte composition of the present invention comprises an aromatic polymer phosphonic acid derivative in which a phosphonic acid group and others directly bond to the aromatic ring and a phosphoric acid derivative shows proton conductivity even under the high-temperature conditions of 100° C. or higher. Furthermore, the polymer electrolyte composition which contains the phosphoric acid derivative in an amount of two equivalents or more with respect to the number of phosphorus atoms of the aromatic polymer phosphonic acid derivative shows further excellent and stable proton conductivity. Moreover, fuel cells excellent in endurance can be obtained by using the polymer membrane obtained from the polymer electrolyte composition as a diaphragm of the fuel cells.

What is claimed is:

1. A polymer electrolyte composition comprising an aromatic polymer phosphonic acid derivative represented by the following formula (1); and at least one selected from the group consisting of a phosphoric acid derivative and a polymer electrolyte

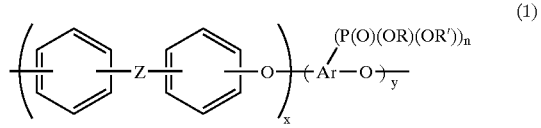

(1)

(wherein -Z- represents —$SO_2$— or —CO—, x and y each represent 0.01-0.99 provided that the sum of x and y is 1, —Ar— represents a divalent aromatic group of 4–18 carbon atoms which may contain a hetero atom and may contain one or more substituents, n represents the average number of substituents per unit structure of polymeric moiety containing the aromatic group and is a positive number of 8 or less, and R and R' each independently represent a hydrogen atom or an alkyl group).

2. A polymer electrolyte composition according to claim 1, wherein —Ar— is a phenylene group which may be substituted or a biphenyldiyl group which may be substituted.

3. A polymer electrolyte composition according to claim 1, wherein at least one of R and R' is a hydrogen atom.

4. A polymer electrolyte composition according to claim 1, wherein the polymer electrolyte has a proton conductivity of not less than $1 \times 10^{-4}$ S/cm.

5. A polymer electrolyte composition according to claim 1 wherein the phosphoric acid derivative is represented by the following formula (2):

(2)

(wherein R''' represents an alkyl group of 1–6 carbon atoms or an aryl group, k represents 0–2 and when k is 2, the two R''' may be the same or different).

6. A polymer electrolyte composition according to claim 5 which contains the phosphoric acid derivative in an amount of not less than two equivalents with respect to the number of phosphorus atoms of the aromatic polymer phosphonic acid derivative.

7. A polymer electrolyte composition according to claim 5, wherein k is 0.

8. A polymer electrolyte composition membrane which is prepared using the polymer electrolyte composition of any one of claims 1–7.

9. A polymer electrolyte composition membrane according to claim 8 wherein the membrane is obtained by casting a solution of the polymer electrolyte composition and volatilizing a solvent.

10. A polymer composite membrane which comprises the polymer electrolyte composition of any one of claims 1–7 and a substrate.

11. A polymer composite membrane according to claim 10, wherein the substrate is a porous substrate membrane comprising an aliphatic polymer or a fluorine-containing polymer.

12. A fuel cell which is prepared using the polymer electrolyte composition of any one of claims 1–7.

13. A fuel cell which is prepared using the polymer electrolyte composition membrane according to claim 8.

14. A fuel cell which is prepared using the polymer electrolyte composition membrane according to claim 9.

15. A fuel cell which is prepared using the polymer composite membrane according to claim 10.

16. A fuel cell which is prepared using the polymer composite membrane according to claim 11.

* * * * *